United States Patent [19]

Giacosa

[11] 4,371,361
[45] Feb. 1, 1983

[54] METAL BELT FOR DRIVE TRANSMISSION
[75] Inventor: Dante Giacosa, Turin, Italy
[73] Assignee: Fiat Auto S.p.A., Turin, Italy
[21] Appl. No.: 195,804
[22] Filed: Oct. 10, 1980
[51] Int. Cl.³ .............................................. F16G 5/16
[52] U.S. Cl. .................................... 474/201; 474/242
[58] Field of Search ........ 474/201, 230, 240, 242–243, 474/244, 245

[56] References Cited

U.S. PATENT DOCUMENTS

| | | | |
|---|---|---|---|
| 962,563 | 6/1910 | Foster et al. | 474/201 |
| 3,720,113 | 3/1973 | Van Doorne et al. | 474/242 |
| 4,080,841 | 3/1978 | Vollers | 474/201 |
| 4,303,403 | 12/1981 | Lamers | 474/201 |
| 4,338,081 | 7/1982 | Hattori et al. | 474/272 |

FOREIGN PATENT DOCUMENTS

| | | | |
|---|---|---|---|
| 2414989 | 10/1975 | Fed. Rep. of Germany | 474/201 |
| 256918 | 3/1949 | Switzerland | 474/201 |

*Primary Examiner*—Lawrence J. Staab
*Assistant Examiner*—Andrew Joseph Rudy
*Attorney, Agent, or Firm*—Sughrue, Mion, Zinn, Macpeak & Seas

[57] ABSTRACT

A continuous metal belt for a pulley drive system with V-grooved pulleys includes a flexible metal loop which acts as a guide for a plurality of drive-transmitting blocks slidable on the loop and retained thereon by respective recesses in the blocks. The recess of each block has two lateral guide walls having at their free ends respective retaining projections with active retaining surfaces which face the loop. A plurality of channel elements are arranged with their bottoms extending between the active surfaces and the loop, and their sides between the lateral guide walls and the edges of the loop, so as to reduce rotational movement of the blocks and prevent damaging contact between the blocks and the loop.

6 Claims, 4 Drawing Figures

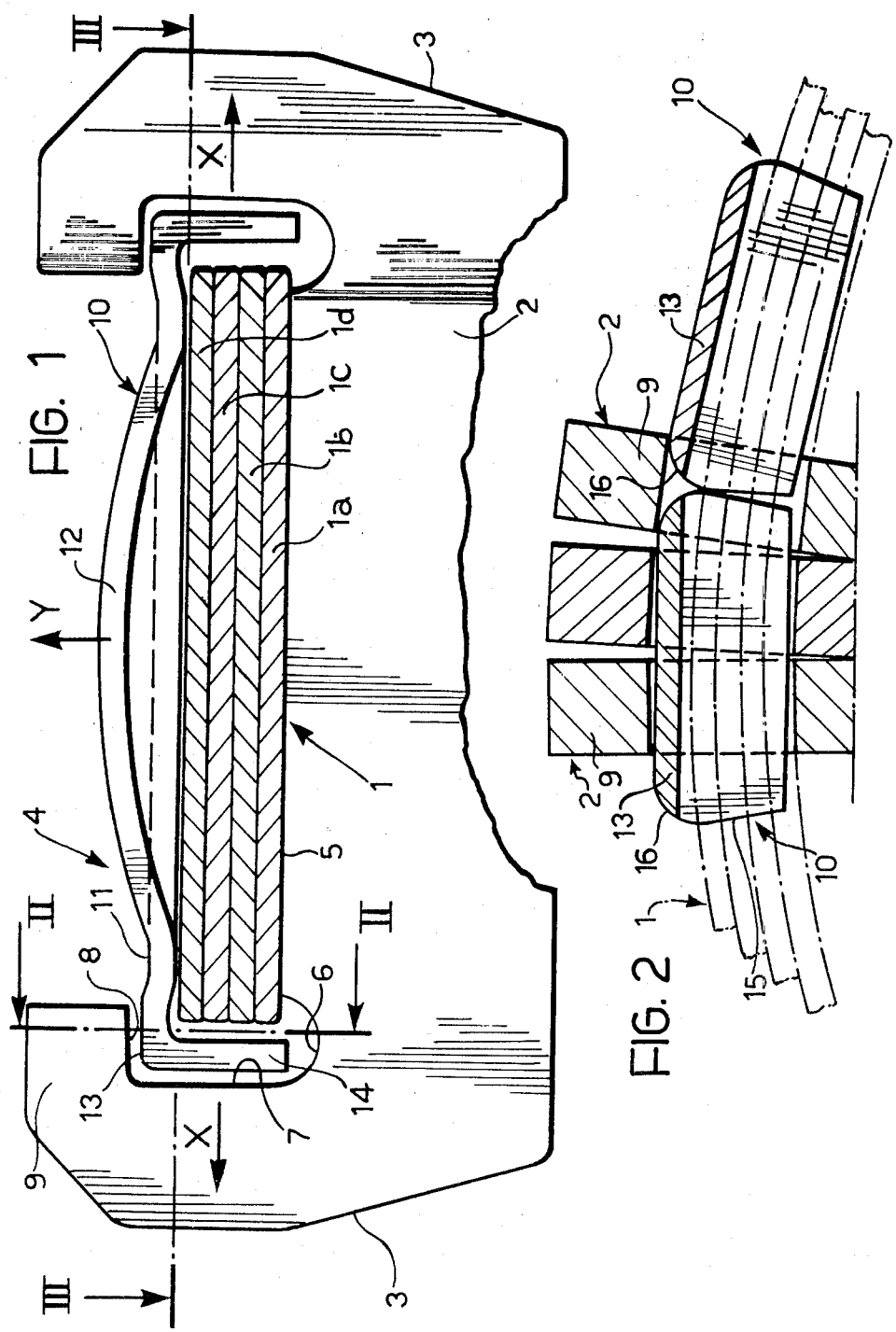

U.S. Patent  Feb. 1, 1983  Sheet 2 of 2  4,371,361
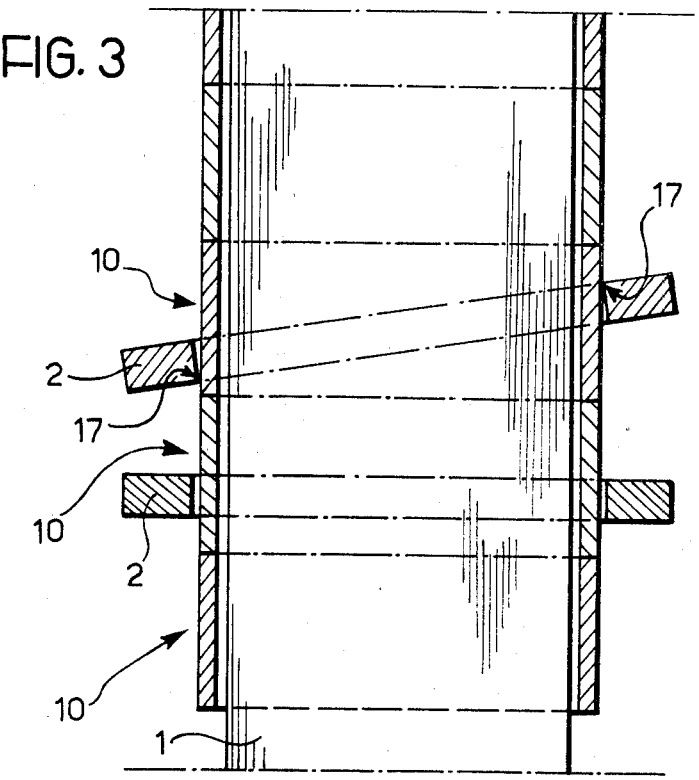
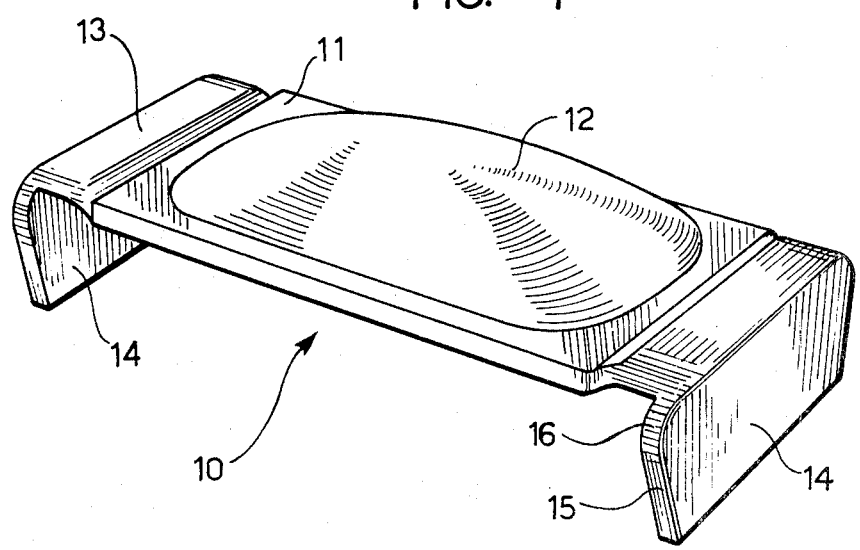

METAL BELT FOR DRIVE TRANSMISSION

The present invention relates to a continuous metal belt for transmission of drive between V-groove pulleys, comprising a flexible loop constituted by at least one metal band serving as a guide, and a plurality of V-shaped blocks longitudinally slidable around the flexible loop for effecting transmission of the drive.

The object of the present invention is to provide a system for retaining the blocks on the flexible guide loop which, during operation, avoids the risk of damage to the flexible guide loop by the blocks while still allowing relative movement between the blocks and the guide loop, not only in the longitudinal direction, but also along two axes perpendicular to this direction.

According to the invention this technical problem is resolved by the fact that:

(a) each block is provided, in a manner known per se, with a recess in which the metal band is lodged; the recess having two lateral guide walls each provided at the top with a retaining projection having an active retaining surface facing the band, (b) a plurality of channel elements are disposed with their bottoms extending between the flexible band and the active surfaces of the retaining projections of the blocks, and with their sides extending between the lateral guide walls and the lateral edges of the metal band.

The channel elements constitute means for retaining the blocks on the flexible metal loop and form a kind of tunnel which protects the lateral edges of the flexible loop, preventing lateral contact between the blocks and edges.

Further characteristics and advantages of the present invention will become apparent from the description which follows with reference to the appended drawings, provided purely by way of non-limitative example, in which:

FIG. 1 is a transverse section of a metal belt for drive transmission according to the invention, FIG. 2 is a transverse section taken on the line 2—2 of FIG. 1, FIG. 3 is a section taken on the line 3—3 of FIG. 1 with several parts omitted for the sake of clarity, and FIG. 4 is a perspective view of one of the channel elements.

A flexible metal band 1 in the form of a closed loop comprises four superimposed metal layers, respectively indicated 1a, 1b, 1c, 1d. The band 1 constitutes the guide element of a metal drive transmission belt, the drive transmitting members of which comprise a plurality of metal blocks 2 having limited dimensions in the axial sense and mounted slidably on the band 1.

Each block 2 has two sides 3 forming a V for engagement in corresponding V-grooves of transmission pulleys (not illustrated) and, moreover, a recess 4 with a flat bottom part 5 having a width slightly less than the width of the metal band 1. The bottom part 5 of the recess 4 has at its sides two recessed parts 6 in the form of semi-circular grooves which are connected with two lateral guide walls 7. Two retaining surfaces 8 extend inwardly from the top of the lateral guide walls 7 to form part of two projections 9 of the block 2 facing the middle of the cavity 4.

A channel element, generally indicated 10, serves to retain the metal band 1 in the cavity 4 of the blocks 2, and has an axial length preferably greater than that of the blocks 2, for example, equal to 3.5 times the length of the block.

The channel element 10 has a flat bottom 11 with a central convex reinforcing portion 12 and is intended to resist relative displacements between the band 1 and the block 2 in the direction of the axis Y shown in FIG. 1. The bottom of the channel element 10 has two longitudinal raised portions 13 to which the sides 14 of the channel element are connected.

As clearly illustrated in FIG. 1, the sides 14 extend with clearance between the lateral guide walls 7 and the lateral edges of band 1, and the raised portions 13 face the retaining surfaces 8 of the projections 9. The sides 14 of the channel elements 10 have a trapezoidal outline and their end surfaces, indicated 15, are joined to the bottom by means of rounded portions 16, as shown in FIGS. 2 and 4.

The channel elements 10 allow a certain freedom of relative movement between the blocks 2 and the band 1 both along the axis Y and along the axis X, shown in FIG. 1. The presence of these channel elements 10, however, reduces the possibility of rotation of the blocks 3 about their vertical axes, as illustrated in FIG. 3, where for simplicity only two blocks have been shown: one in the normal position and the other in the position of maximum inclination. Moreover, direct contact between the corners 17 of the sides of the blocks 2 (see FIG. 3) and the metal band 1 is eliminated, such contact being a possible cause of damage to the band itself.

What is claimed is:

1. A continuous metal belt for drive transmission between V-groove pulleys, comprising:
    a flexible loop constituted by at least one metal band and acting as a guide, and
    a plurality of V-shaped blocks lodged on said loop and having respective recesses in which the loop is engaged, said blocks being slidable longitudinally on said loop to transmit the drive, wherein the improvement consists in:
    said recess of each said block being defined by two lateral guide walls having free edges, said free edges being provided with respective retaining projections having active surfaces facing said band, and
    a plurality of channel elements being arranged with their bottoms extending between said band and said active surfaces, and their sides between said lateral guide walls and respective edges of said band.

2. A metal belt as defined in claim 1, wherein the axial length of each said channel element is greater than that of each said block.

3. A metal belt as defined in claim 1, or claim 2, wherein the axial length of each said channel element is approximately three times the length of each said block.

4. A metal belt as defined in claim 1, wherein the sides of said channel elements are trapezoidal in outline and are connected to said channel bottoms by rounded portions.

5. A metal belt as defined in claim 1, wherein the bottom of said recess of each said block has a central flat zone, with a width slightly less than the width of said metal band, and two recessed end parts having surfaces which face said active surfaces of said retaining projections and are joined to said lateral guide walls.

6. A metal belt as defined in claim 1, wherein the bottom of each said channel element has a central convex reinforcing portion.

* * * * *

UNITED STATES PATENT AND TRADEMARK OFFICE
CERTIFICATE OF CORRECTION

PATENT NO. : 4,371,361

DATED : February 1, 1983

INVENTOR(S) : Dante Giacosa

It is certified that error appears in the above-identified patent and that said Letters Patent is hereby corrected as shown below:

On The Title Page insert:

-- [30]   Foreign Application Priority Data

Oct. 26, 1979   Italy----------69091-A/79   --.

Signed and Sealed this

First Day of January 1985

[SEAL]

Attest:

GERALD J. MOSSINGHOFF

*Attesting Officer*  *Commissioner of Patents and Trademarks*